United States Patent [19]

Hollister et al.

[11] 3,782,077
[45] Jan. 1, 1974

[54] DIFFUSION CELL
[75] Inventors: Ralph George Hollister; Denis Arthur Stiles, both of London, England
[73] Assignee: Johnson, Matthey & Co. Limited, London, England
[22] Filed: Mar. 20, 1972
[21] Appl. No.: 236,397

[30] Foreign Application Priority Data
Mar. 23, 1971 Great Britain ..................... 7,566/71

[52] U.S. Cl. ................................................. 55/158
[51] Int. Cl. ............................................ B01d 53/22
[58] Field of Search ................................. 55/16, 158

[56] References Cited
UNITED STATES PATENTS
3,410,058 11/1968 Oswin .................................. 55/158
3,245,206 4/1966 Bonnet.................................. 55/158
3,469,372 9/1969 Yamauchi et al..................... 55/158

Primary Examiner—Charles N. Hart
Attorney—John W. Malley et al.

[57] ABSTRACT

This specification describes a hydrogen diffusion unit for separating mixtures from gaseous mixtures containing hydrogen. The unit comprises two superimposed metal foils bonded together at their edges to form an envelope and at least one of the foils is corrugated or undulated and each corrugation or insulation is supported by a helix of stainless steel or like wire adapted to prevent collapse of the unit when subject to high external pressures in use.

6 Claims, 3 Drawing Figures

PATENTED JAN 1 1974　　　3,782,077

DIFFUSION CELL

This invention relates to diffusion units formed of two superimposed metal foils such as silver/platinum and suitable particularly for incorporation in the "foil cell" described in the prior specification of British application Ser. No. 6,724/69.

In the cell referred to the flat foils forming the walls of each diffusion unit are supported by a woven wire insert or a porous sintered metal insert and when such units are subjected to the high external pressures and high temperatures obtaining under normal operating conditions, there is a tendency for the foil or each foil to become bonded to the insert. Subsequent temperature changes involving differential contraction or expansion of the foil and insert may thus result in the mechanical failure of the foil.

During such operating conditions the foil tends to be forced into the individual external pores of the insert while being bonded firmly to the surface between said pores and as a result only relatively narrow passages are available for conveying diffused hydrogen to a collecting manifold.

It is an object of the invention to provide a diffusion unit which is mechanically stronger and which more readily permits the diffusion and collection of hydrogen.

According to the invention at least one of the foil sheets is corrugated or undulated and in each corrugation trough between the foil sheets is located a helix of stainless steel or like wire adapted to prevent collapse of the unit when subjected to high external pressure during use.

Preferably, both the foil sheets are corrugated or undulated and are so relatively disposed that the corrugations of the respective sheets extend at an angle to one another. The helically wound wires preferably fit snugly in the respective troughs between the sheets.

The peripheral edges of the sheets are preferably formed with flat flanges or with flanges having mating corrugations so that each pair of sheets may be bonded together along said edges. The sheets may also be correspondingly formed and bonded together around the periphery of a central hole within the sheets formed to accommodate a gas collecting manifold as described in the specification referred to above.

The invention will be described by way of example with reference to the embodiments thereof shown in the accompanying drawings in which.

Figure 1:
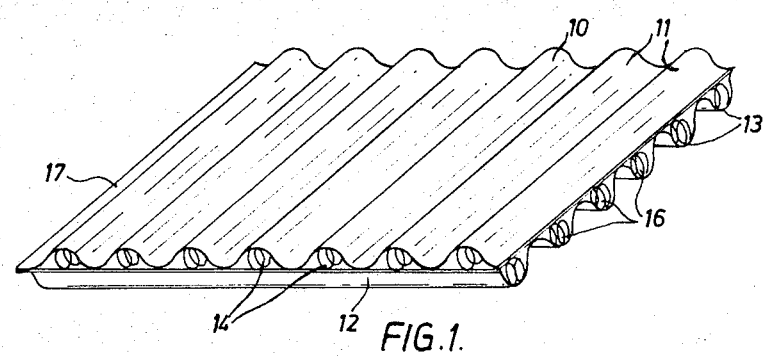
FIG. 1 shows a perspective view, partly in section, of one form of diffusion unit, according to the invention.

Referring to FIG. 1, an upper foil sheet 10 is formed with corrugations 11 extending in the figure from top to bottom of the sheet 10 and is superimposed on a lower foil sheet 12 provided with corrugations 13 extending from side to side of the sheet 12, that is substantially at right angles to the corrugations 11. Within each trough of the corrugations 11 facing the sheet 12 is arranged a helix 14 of stainless steel wire which fits snugly in the trough throughout its length. Within each trough of the corrugations 13 facing the upper sheet 10 is arranged a correspondingly formed helix 16.

The edges of the unit are provided with a flat (i.e., plane) flange as shown diagrammatically at 17 (FIG. 1) along which the foil sheets are bonded together.

Figure 3:
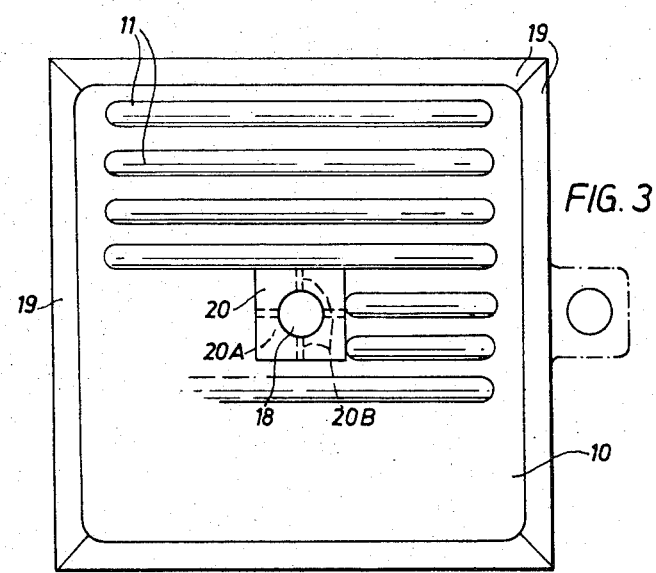
FIG. 3 is a diagrammatic plan view of a unit formed as shown in FIG. 1.

A rectangular diffusion unit formed as above with a central hole is shown in FIG. 3. This shows diagrammatically the upper foil sheet 10 superimposed on a lower sheet and formed with corrugations 11. A central hole 18 is formed in the unit to receive a gas collecting manifold (not shown). The upper and lower foil sheets are flattened around each peripheral edge 19 to form a bond and also around the hole 18 as shown by the dotted rectangle 20.

In order to support the upper and lower sheets 10 and 12 in the region of the hole 18, a support 20A of rectangular plan and thickness corresponding to the distance required between the sheets 10 and 12, is located between the flattened areas 20. The support 20A has a central hole which is coaxial and of the same diameter as the hole 18 and, to permit access from the central hole and the interior of the unit a number of holes 20B are drilled in the support 20A. Alternatively, as above mentioned, the edges of one of the foil sheets may be formed with corrugations which mate with the corrugations of the other sheet. In an alternative construction the central hole 18 may be replaced by one or more collecting tubes disposed in any other convenient position for leading the diffused hydrogen into, for example, a collecting manifold or conduit.

Where a plurality of units are mounted on a common manifold, sealing between adjacent units may be improved by locating O-ring type seals in annular grooves formed, for example, in the flattened area 20 of FIG. 3. The O-ring seals may be made from gold or other metallic or plastics materials.

Figure 2:
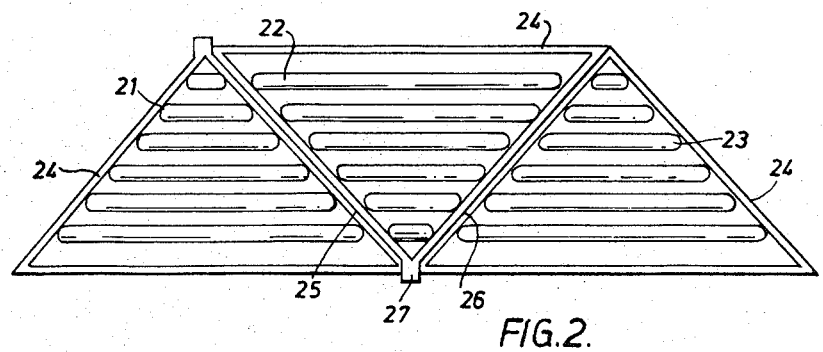
FIG. 2 shows diagrammatically in plan view a second embodiment of the invention.

The units are not necessarily of rectangular shape. For example, the upper and lower foil sheets may be of circular shape with flattened edge flanges. Also, as shown in FIG. 2, the unit may be composed of triangular sections 21, 22, 23 of superimposed foil sheets, at least one of which is corrugated. In this case, the outer peripheral edge 24 is formed of flattened flanges bonded together while each internal edge 25, 26 of the triangular sections is bonded to the contiguous edge of the adjacent section. A gas collecting manifold may be connected to the tube 27, which is, in turn, connected to the contiguous apices of triangular units 21, 22 and 23 so that hydrogen gas which diffuses through the walls of these units will pass into the tube 27.

In another construction, the hole for receiving a gas collecting manifold may be located in externally extending projections if the peripheral edges such as 19 in FIG. 3. This construction is shown in dot/dash lines in FIGS. 3 and, in such a construction all the corrugations 11 would be of the same length.

Diffusion units formed as described above are cheaper to produce since helical wire coils are easier and cheaper to make than known woven wire or sintered metal internal supports. The use of corrugations containing helical coils enables the foil sheets of the unit to expand and contract during temperature variations without mechanical failures arising.

For any given area covered by the unit, a corrugated sheet construction provides about 1.5 times the diffusion area of a unit having flat sheets and in addition this construction will more readily allow the diffusion of hydrogen through the unit walls and its passage into a collecting manifold.

What we claim is:

1. A hydrogen diffusion member or unit for separating hydrogen from gaseous mixtures containing hydrogen and comprising two superimposed metal foils bonded together at their edges to form an envelope, both of the foil sheets being corrugated or undulated and a helix of stainless steel or like wire adapted to prevent collapse of the unit when subjected to high external pressure during use in each corrugation through between the sheets, said sheets being so relatively disposed that the corrugations of the respective sheets extend at an angle to one another.

2. A diffusion member according to claim 1 wherein said corrugations are straight.

3. A diffusion member according to claim 1 wherein the wire helices are of such diameter as to fit snugly within the troughs.

4. A diffusion member according to claim 1 wherein the peripheral edges of the sheets comprise flat flanges to facilitate the bonding together of the sheets.

5. A diffusion member according to claim 1 wherein the peripheral edges of the sheets are formed as flanges having mating corrugations to facilitate the bonding together of said edges.

6. A diffusion member according to claim 1 wherein the sheets are formed with central holes and are bonded together around the periphery of said holes.

* * * * *